United States Patent [19]

Ryan

[11] Patent Number: 4,899,867
[45] Date of Patent: Feb. 13, 1990

[54] ROTOR FOR AN AGRICULTURAL FEED BAGGER

[76] Inventor: Kelly P. Ryan, P.O. Box 488, Blair, Nebr. 68008

[21] Appl. No.: 148,335

[22] Filed: Jan. 25, 1988

[51] Int. Cl.$^4$ .............................................. B65G 3/04
[52] U.S. Cl. .................................. 198/513; 141/114; 198/662; 198/669
[58] Field of Search ............... 198/513, 662, 664, 669; 141/10, 114; 100/100, 177; 56/16.6, 344; 414/526, 310–312, 319–321, 326, 158, 175, 190, 197, 213

[56] References Cited

U.S. PATENT DOCUMENTS

| | | | |
|---|---|---|---|
| Re. 31,810 | 1/1985 | Lee ...................................... | 141/114 |
| 3,687,061 | 8/1972 | Eggenmuller et al. ............... | 100/65 |
| 4,046,068 | 9/1977 | Eggenmuller et al. ............... | 100/65 |
| 4,337,805 | 7/1982 | Johnson et al. ....................... | 141/71 |
| 4,621,666 | 11/1986 | Ryan .................................... | 141/114 |

Primary Examiner—Robert J. Spar
Assistant Examiner—D. Glenn Dayoan
Attorney, Agent, or Firm—Zarley, McKee, Thomte, Voorhees & Sease

[57] ABSTRACT

A rotor for an agricultural feed bagger comprising an elongated cylindrical member having first and second sets of rotor teeth mounted therein with the first and second sets being arranged on the cylindrical member in opposing helical fashions. First and second sets of auxiliary rotor teeth are mounted on the cylindrical member within the helical patterns defined by the first and second sets of rotor teeth so that silage material delivered to the center of the rotor will be subjected to a greater number of rotor teeth than silage delivered to the ends of the rotor.

2 Claims, 3 Drawing Sheets

ROTOR FOR AN AGRICULTURAL FEED BAGGER

BACKGROUND OF THE INVENTION

This invention relates to a rotor for an agricultural feed bagger and more particularly to an improved rotor for an agricultural feed bagger.

Horizontally expansive silage storage bags have become known and used as alternatives to permanent storage structures, such as barns or silos. Such storage bags are desirable from an economic standpoint and are advantageous in that they are easily loaded and the stored material is readily accessible. An early type of apparatus for bagging is disclosed in Eggenmuller et al. U.S. Pat. No. 3,687,061.

A currently existing apparatus for loading such receptacles is disclosed in Eggenmuller et al. U.S. Pat. No. 4,046,068 wherein an apparatus for bagging silage is shown. A loading channel supports an unfilled bag and guides the silage from a press roll having spirally located teeth about the outer periphery of the roll. Feed stock is fed into a hopper where it is forced by a reciprocating member into the press roll whose teeth force the feed stock into the storage bag. A gate is held against the closed end of the storage bag with cables connected therefrom to a drum on the apparatus, which drum has a brake arrangement applying tension to the cables so that as the storage bag is filled, the brake will release the cable and the apparatus will move away from the gate.

A modification of the Eggenmuller et al '068 patent is disclosed in Johnson et al. U.S. Pat. No. 4,337,805 wherein substantially the same apparatus is provided except that the press roll or rotor has randomly located groups of teeth, each group having four teeth, about the periphery thereof for forcing the feed stock into a truncated triangular tunnel (as sectioned transverse to the direction of movement of the feed stock) and then into the storage bag. A feeder roll is rotated in the bottom of a feed hopper to advance the feed stock into the press roll. A disc brake arrangement is used to add the resistance to the cable on the drum so as to pay out the cable as the storage bag is filled. A sprocket drive arrangement is employed to drive both the feeder roll and the press roll.

In U.S. Pat. No. 4,046,068, the press roll or rotor is provided with a plurality of teeth arranged spirally on a shaft or drum in two sets or groups which oppose one another. Although the opposing sets of helical arranged teeth do perform generally satisfactorily, it has been found that there are large voids thereon wherein teeth are not present. The absence of teeth on certain portions of the rotor results in an uneven stuffing or feeding of the feed stock into the bag especially when the feed being conveyed to the rotor is dumped onto the rotor at the middle thereof.

It is therefore a principal object of the invention to provide an improved rotor for an agricultural bagging machine.

A further object of the invention is to provide an improved rotor or press roll for an agricultural bagging machine comprising a pair of opposing sets of helically arranged teeth with a pair of supplemental sets of teeth being provided adjacent the middle portion of the rotor to ensure an efficient and even packing or stuffing of the feed material into the bag.

SUMMARY OF THE INVENTION

Figure 1:
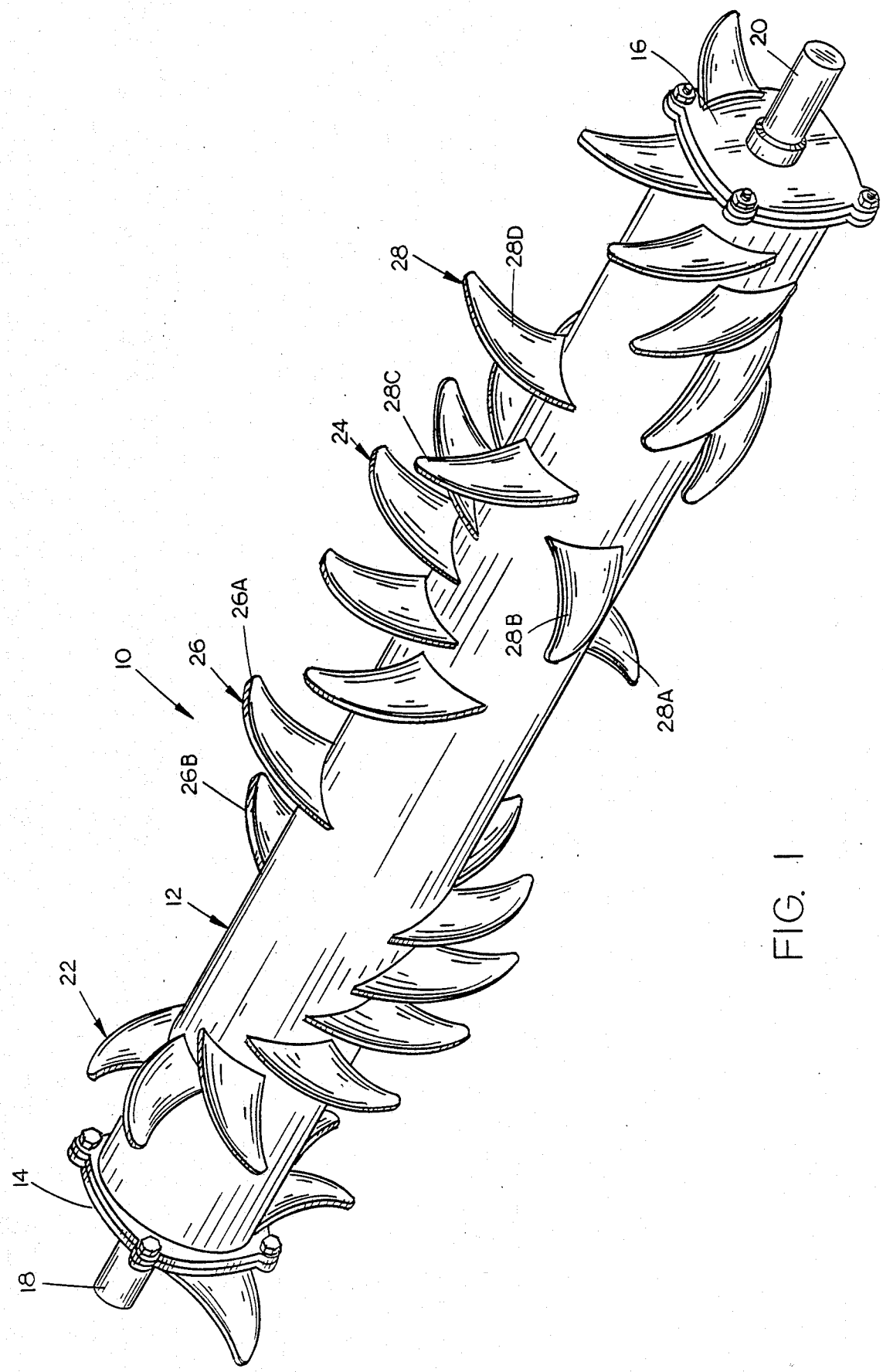
FIG. 1 is a perspective view of the rotor of this invention.
Figure 2:
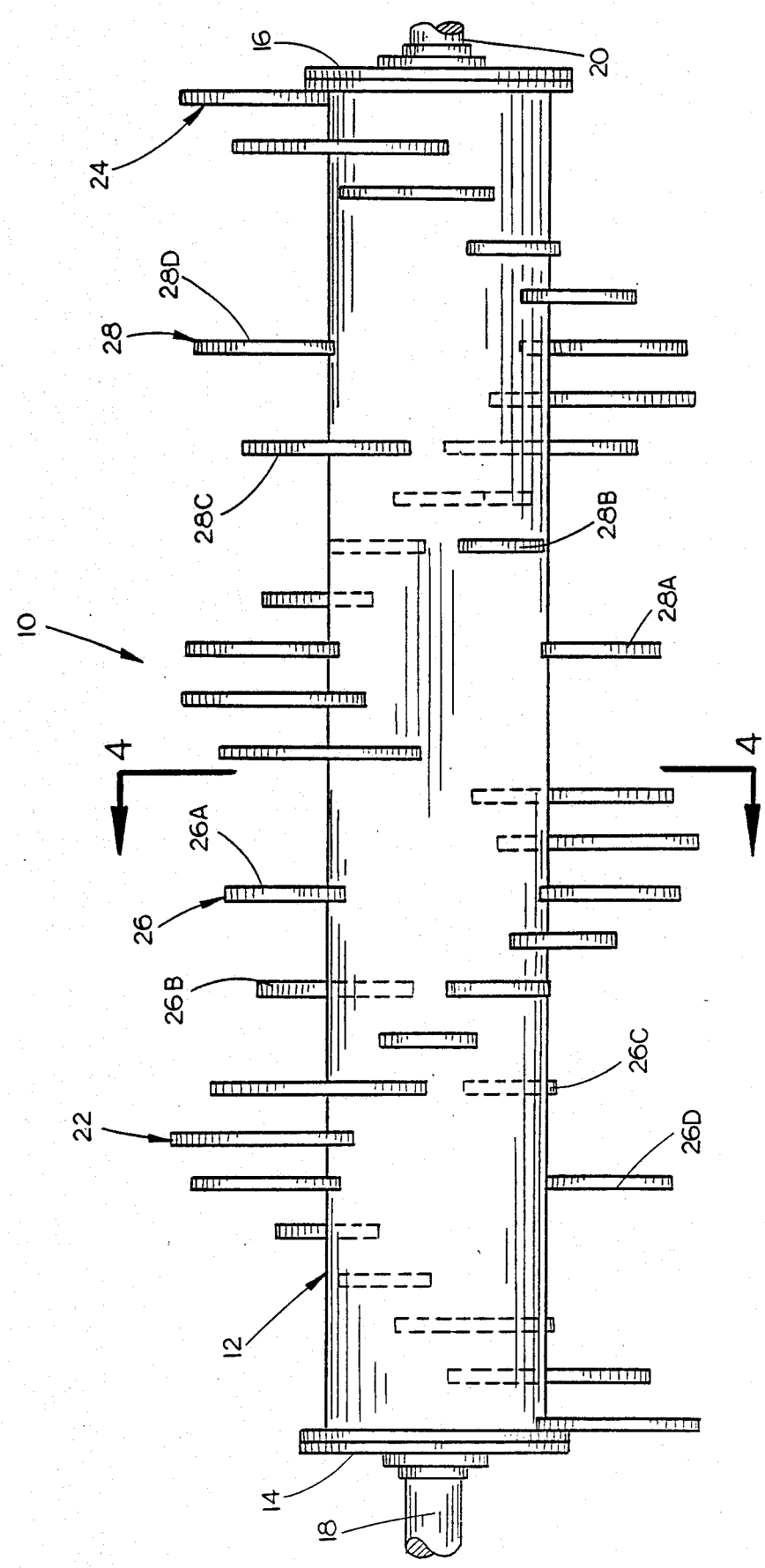
FIG. 2 is a front elevational view of the rotor.
Figure 3:
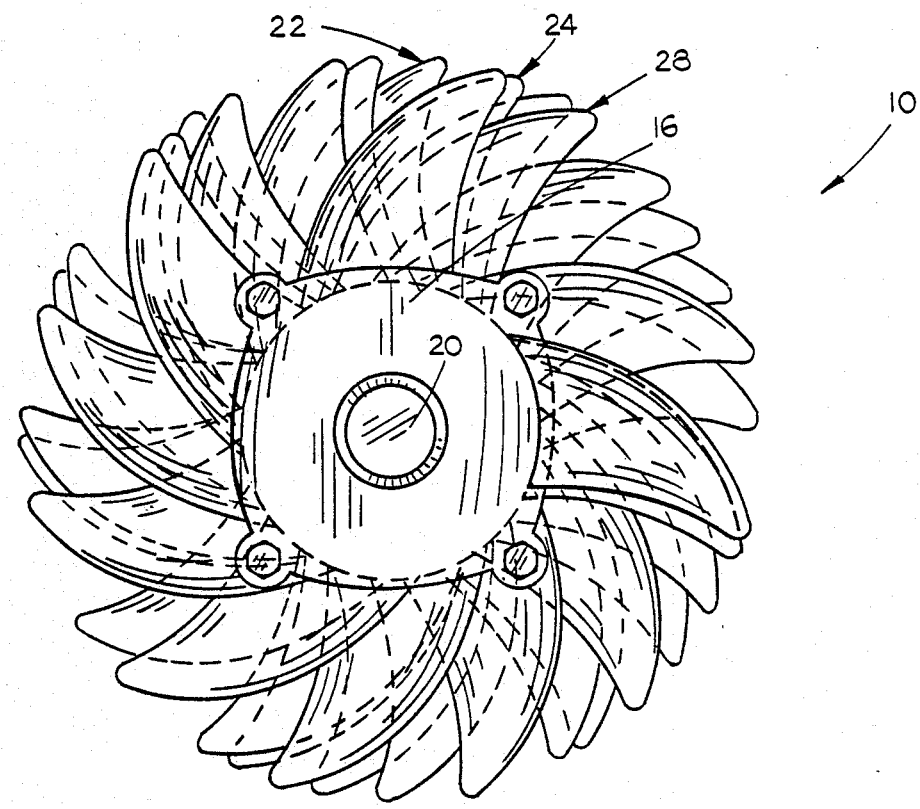
FIG. 3 is an end elevational view of the rotor.
Figure 4:
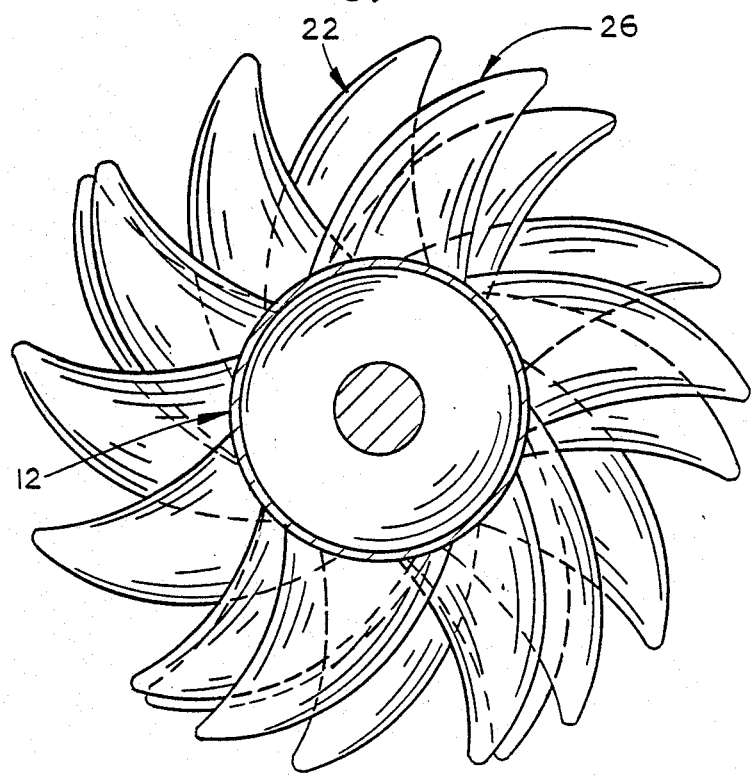
FIG. 4 is an enlarged sectional view seen on lines 4—4 of FIG. 2.

An improved rotor for an agricultural feed bagger is disclosed with the rotor comprising an elongated cylindrical member having first and second sets of rotor teeth mounted on the periphery thereof. The first set of rotor teeth extends, in a helical fashion, from the center of the cylindrical member to one end thereof. The second set of rotor teeth extends, in a helical fashion, from the center of cylindrical member to the other end of the cylindrical member. The helical arrangement of the first set of rotor teeth is disposed oppositely to the helical arrangement of the second set of teeth. A first set of auxiliary rotor teeth is mounted on the cylindrical member between the center thereof and the one end of the cylindrical member within the helical pattern defined by the first set of rotor teeth. A second set of auxiliary rotor teeth is mounted on the cylindrical member between the center thereof and the other end thereof within the helical pattern of the second set of teeth. The placement of the first and second sets of auxiliary rotor teeth on the rotor teeth results in additional rotor teeth being provided at the center of the rotor so that silage material delivered to the center of the rotor will be subjected to a greater number of rotor teeth than silage delivered to the ends of the rotor.

DESCRIPTION OF THE PREFERRED EMBODIMENT

The rotor of this invention is referred to generally by the reference numeral 10 and is designed to be employed in an agricultural bag loading apparatus such as shown in U.S. Pat. No. 4,621,666 or the like. Rotor 10 is comprised of an elongated cylindrical member or drum 12 having opposite ends 14 and 16. Shaft stubs 18 and 20 extend outwardly from ends 14 and 16 respectively for rotatably mounting the rotor in the agricultural bag loading machine.

A first set of rotor teeth 22 is mounted on the periphery of drum 12 as illustrated in FIG. 1. The first set 22 extends, in a helical fashion, from the center of the drum 12 to end 14. A second set of rotor teeth 24 is also mounted on the periphery of the drum 12 and extends, in a helical fashion, from the center of drum 12 towards end 16. The helical arrangement of set 22 is disposed oppositely to the helical arrangement of set 24.

A first set of auxiliary rotor teeth 26 is mounted on drum 12 between the center thereof and end 14 within the helical pattern defined by set 22. A second set of auxiliary rotor teeth 28 is mounted on drum 12 between the center thereof and end 16 within the helical pattern of the set 24. For purposes of discussion, set 26 will be described as being comprised of teeth 26A, 26B, 26C and 26D. For purposes of discussion, set 28 will be described as comprised of teeth 28A, 28B, 28C and 28D. Preferably, each of the sets 26 and 28 is comprised of four rotor teeth but the ultimate number will depend upon the length of the rotor.

The placement of the sets 26 and 28 on the rotor within the helical patterns of sets 22 and 24 respectively results in additional rotor teeth being provided at the center of the rotor so that silage material delivered to the center of the rotor will be subjected to a greater number of rotating rotor teeth than silage delivered to the ends of the rotor. Such a placement results in a more even packing or stuffing of the silage material into the agricultural bag.

Although the preferred embodiment of the invention provides for first and second sets of auxiliary rotor teeth arranged in helical patterns, the teeth of the first and second sets of auxiliary rotor teeth may be arranged other than in a helical fashion as long as additional teeth are provided on the rotor adjacent the center thereof and positioned within the helical pattern of the first and second sets 22 and 24.

Thus it can be seen that the invention accomplishes at least all of its stated objectives.

I claim:

1. A rotor for an agricultural bagging machine, comprising, an elongated cylindrical member having opposite ends, a first set of rotor teeth mounted on the periphery of said cylindrical member extending from the center thereof to one end thereof, the rotor teeth of said first set being radially offset from one another and arranged in a first helical pattern, a second set of rotor teeth mounted on the periphery of said cylindrical member extending from the center thereof to the other end thereof, the rotor teeth of said second set being radially offset from one another and arranged in a second helical pattern, said first and second helical patterns being opposed to one another, a first set of auxiliary rotor teeth mounted on said cylindrical member inwardly of said one end and adjacent the center of said cylindrical member and being arranged in a helical pattern with the helical pattern of said first set of auxiliary rotor teeth being radially offset from said first helical pattern, a second set of auxiliary rotor teeth mounted on said cylindrical member inwardly of said other end adjacent the center of said cylindrical member with said second set of auxiliary rotor teeth being arranged in a helical pattern with the helical of said second set of auxiliary rotor teeth being radially offset from the said second helical pattern, said first and second sets of auxiliary rotor teeth being disposed on said cylindrical member within said first and second helical patterns defined by said first and second sets of said rotor teeth respectively whereby said rotor will have a larger number of rotor teeth positioned adjacent the center portion thereof than that adjacent its ends so that silage material delivered to the center of the rotor will be subjected to a greater number of rotor teeth than silage delivered to the ends of the rotor.

2. A rotor for an agricultural bagging machine, comprising, an elongated cylindrical member having opposite ends, a first set of rotor teeth mounted on the periphery of said cylindrical member extending from the center thereof to one end thereof, the rotor teeth of said first set being radially offset from one another and arranged in a first helical pattern, a second set of rotor teeth mounted on the periphery of said cylindrical member extending from the center thereof to the other end thereof, the rotor teeth of said second set being radially offset from one another and arranged in a second helical pattern, said first and second helical patterns being opposed to one another, a first set of auxiliary rotor teeth mounted on said cylindrical member inwardly of said one end and adjacent the center of said cylindrical member and being radially offset from the teeth of said first set of rotor teeth, a second set of auxiliary rotor teeth mounted on said cylindrical member inwardly of said other end adjacent the center of said cylindrical member with said second set of auxiliary rotor teeth being radially offset from the teeth of said second set of rotor teeth, said first and second sets of auxiliary rotor teeth being disposed on said cylindrical member within said first and second helical patterns defined by said first and second sets of said rotor teeth respectively whereby said rotor will have a larger number of rotor teeth positioned adjacent the center portion thereof than that adjacent its ends so that silage material delivered to the center of the rotor will be subjected to a greater number of rotor teeth than silage delivered to the ends of the rotor.

* * * * *